United States Patent Office 2,889,780
Patented June 9, 1959

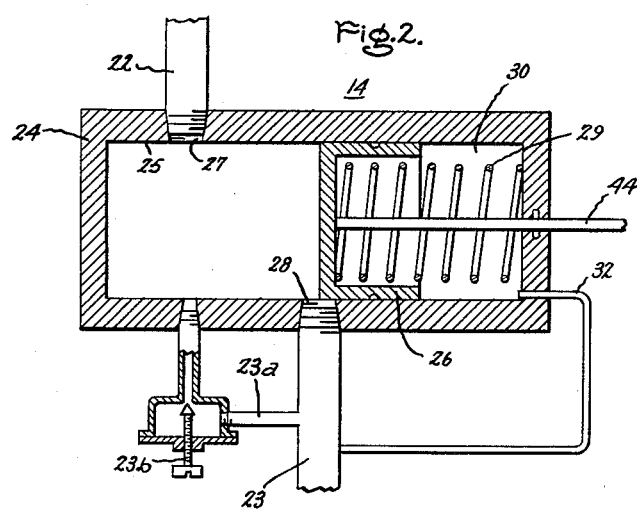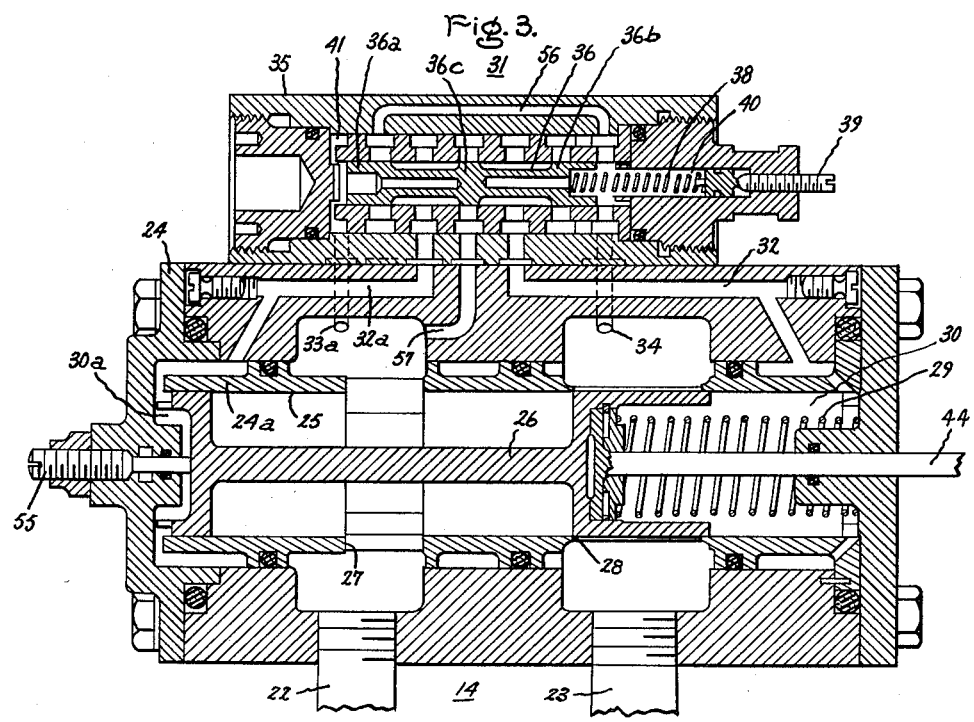

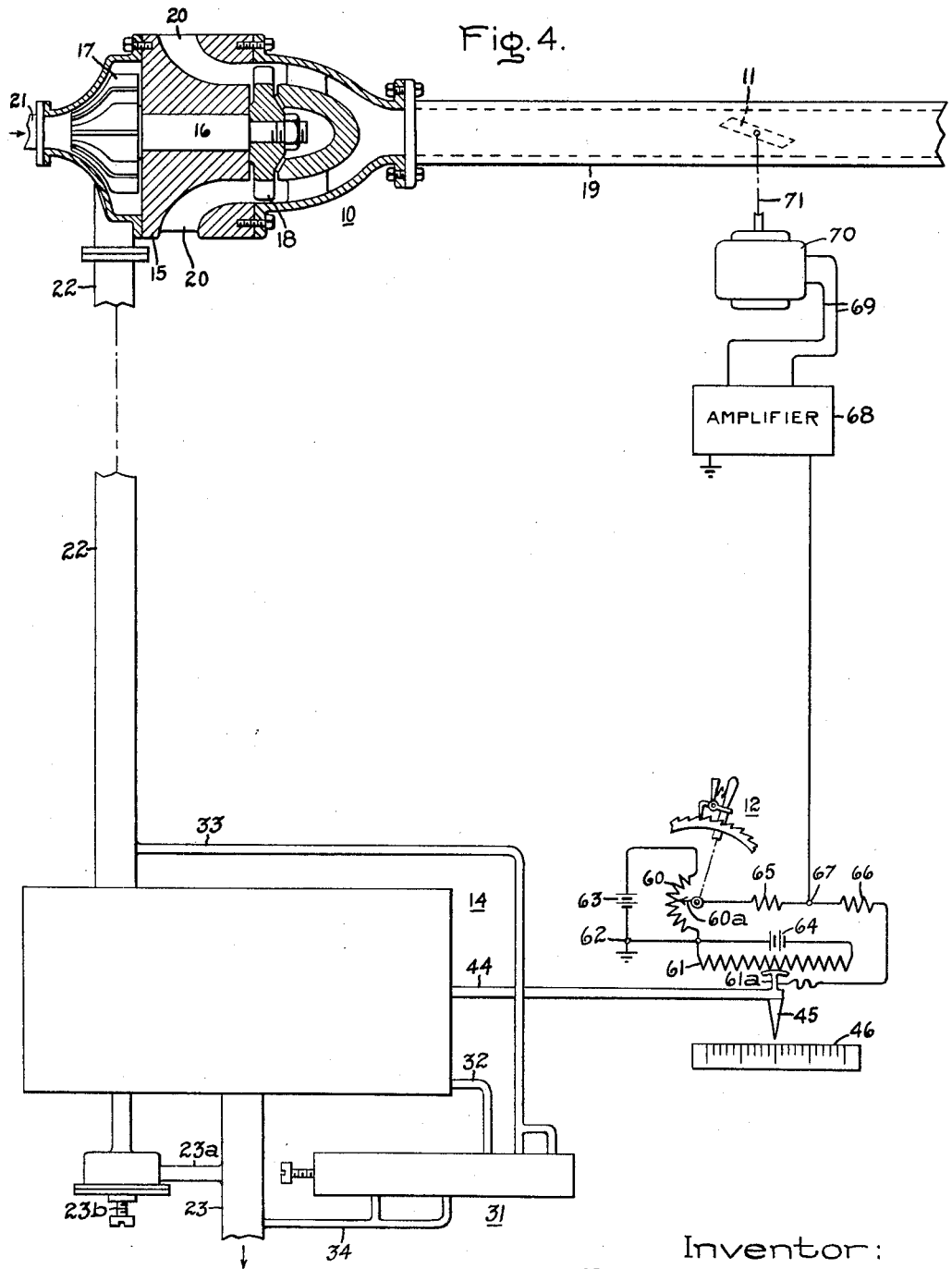

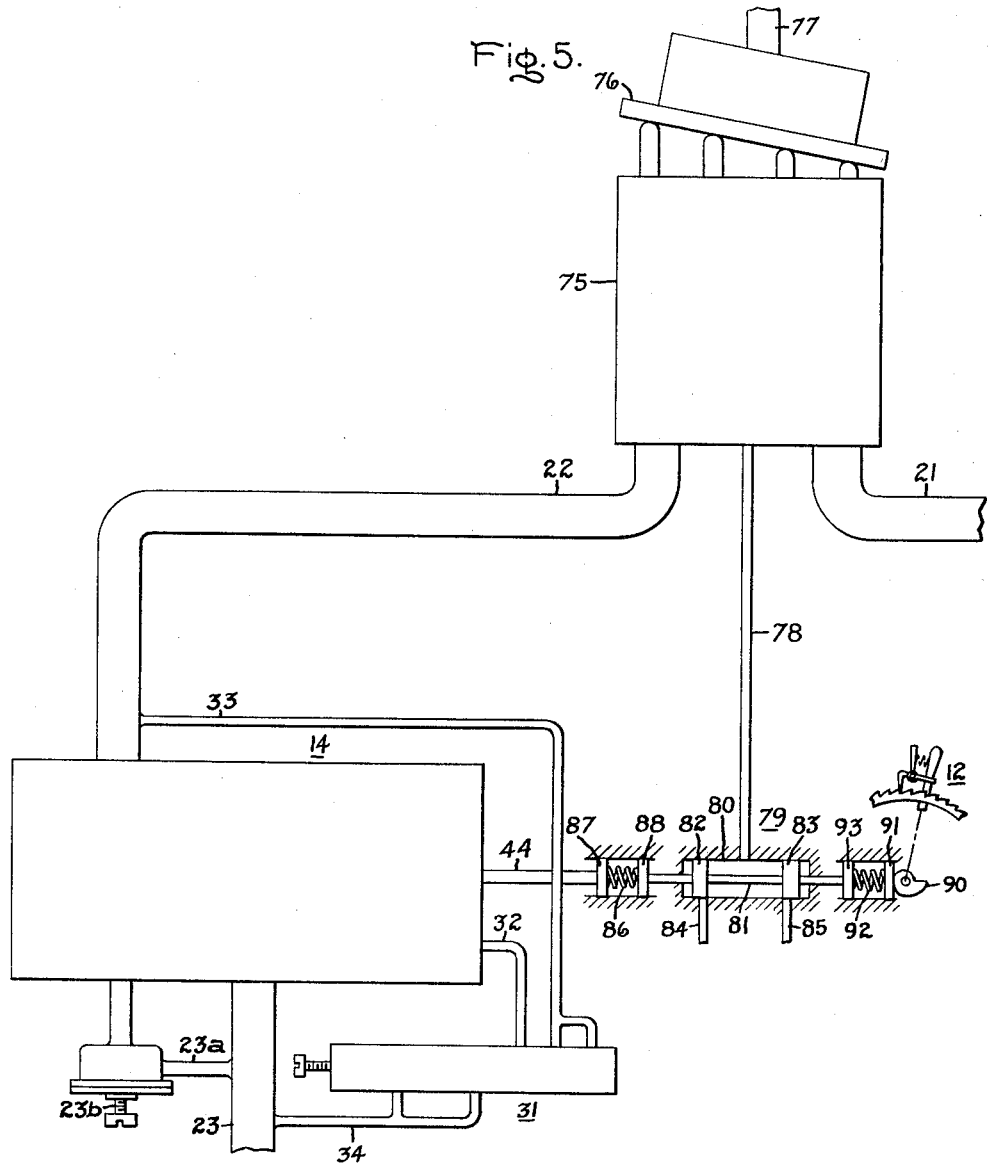

2,889,780

FLUID FLOW MEASUREMENT AND CONTROL APPARATUS

Robert S. Binford, Schenectady, N.Y., assignor to General Electric Company, a corporation of New York Application March 9, 1953, Serial No. 341,305

15 Claims. (Cl. 103—12)

This invention relates to liquid flow control apparatus and more particularly to apparatus for giving a fast response flow measurement signal and for maintaining selected liquid flow rates.

Up until the present time it has been extremely difficult to obtain accurate liquid flow measurements where a high rate of flow is involved, and the best apparatus available for this purpose has been large and cumbersome, including delicate and expensive components, making the apparatus useful only for laboratory purposes. Further, most of the known prior apparatus has been relatively sluggish in its response to changes in flow rate.

Accordingly, it is one important object of the present invention to provide an improved compact, rugged, accurate liquid flow measuring device having an improved, fast measurement response characteristic, and suitable for employment with mobile apparatus.

Another serious problem in prior liquid flow measurement devices, and particularly in liquid flow control devices, has been to obtain liquid flow measurement signals of sufficient power for effective control operation without the necessity for elaborate power amplification apparatus.

Accordingly, it is another important object of the present invention to provide an improved liquid flow measuring and control apparatus having a very high signal power output.

A further object of the present invention is to provide an improved, simplified liquid flow rate control system for maintaining desired adjustable rates of liquid flow.

In some liquid delivery systems it is convenient to employ an expansible motive fluid driven pump employing a motor such as a gas or steam driven turbine in which the input pressure of the motive fluid, the or steam, may vary over a wide range and in which the liquid delivery rate required of the liquid delivery system may also vary over a wide range. With such a pump, it is imperative that a certain minimum load or delivery pressure should be maintained so that the pump and turbine will not be subject to overspeed conditions which might cause serious damage.

Accordingly, it is a further object of the present invention to provide an improved, simplified liquid delivery system, employing a motive fluid driven pump, which automatically maintains adjustable liquid flow values and which also continuously maintains a back pressure on the pump.

In carrying out the objects of the invention in one form a structure may be employed in which the liquid output of an expansible motive fluid turbine-driven pump may be continuously measured by means of a valve-like structure in which a liquid flow restriction is adjusted by a movable valve member to maintain a substantially constant pressure drop across that flow restriction, and the resulting position of the valve member is relied upon as a measure of the liquid flow rate. The position of the valve member and of a flow rate setting device may be compared and the result of the comparison employed to control the pump to obtain the desired liquid delivery flow rate.

Further objects and advantages of the present invention will be apparent from the following description and the accompanying drawings in which:

Fig. 2 is a sectional view of a simplified form of the flow measuring device of this invention, which may be alternatively employed in the system of Fig. 1;

Fig. 3 is a sectional view of a more elaborate and refined version of the flow measuring device, offering a higher measurement signal power amplification, which may be employed in the system of Fig. 1;

Fig. 4 is a schematic diagram of a modification of the fluid delivery system of Fig. 1, in which electrical position indicators, an electrical amplifier, and an electrical positioning motor for controlling the motive fluid valve are employed;

Fig. 5 is a schematic diagram of a further modification of the fluid delivery system of Fig. 1 in which a hydraulic positioning system which is responsive to the flow measuring device is employed for controlling the displacement of a variable displacement liquid pump.

Figure 1:
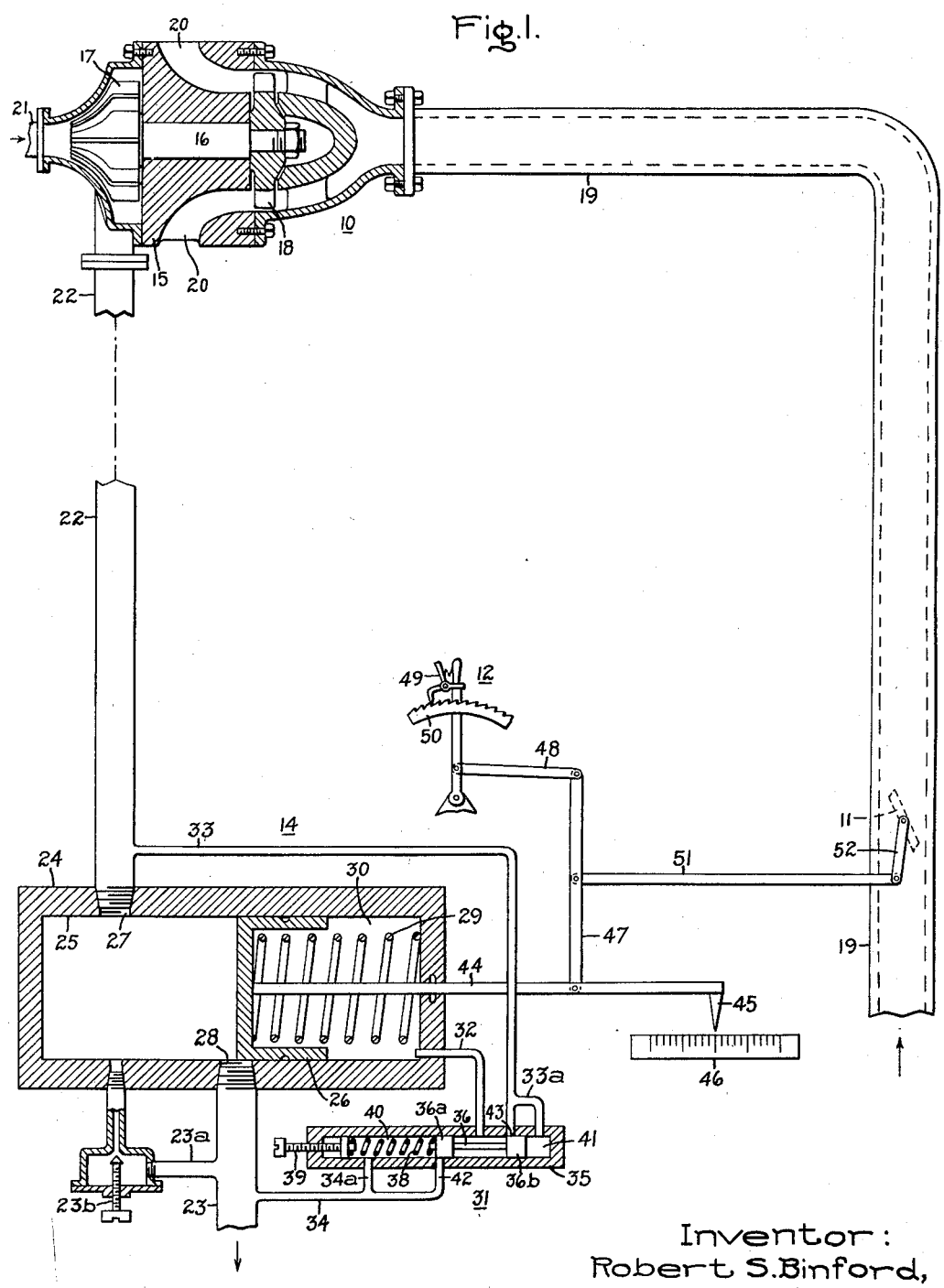
Fig. 1 is a schematic diagram of one embodiment of the fluid delivery system of the present invention.

Referring more particularly to Fig. 1, there is shown a pump 10 which may be controlled by a valve 11 to maintain liquid delivery flow rates determined by a flow setting device 12 as measured by a liquid flow rate measuring device designated generally as 14. The pump 10 includes a housing 15 having a bearing for a central shaft 16 on the respective ends of which may be mounted a pump rotor 17, and a fluid motor rotor 18 which may be in the form of a turbine suitable for use with steam, compressed air, or other compressed gas. The motive fluid may be supplied through a conduit 19 from a suitable source (not shown) and a control valve such as butterfly valve 11 may control the rate of flow of this motive fluid. After passing through the rotor or turbine 18 the motive fluid may be discharged to the atmosphere through discharge ducts 20 in the pump casing 15.

The liquid which is to be pumped may be supplied through a central inlet duct 21 from a suitable reservoir (not shown), and discharged from the pump through discharge line 22 to the flow measuring device 14 from which it is delivered through a conduit 23. The liquid flow measuring device 14 includes a housing 24 having a closed cylindrical interior bore 25 with a valve-like piston member 26 reciprocably mounted therein. The housing includes an inlet port 27 and a discharge port 28 which respectively communicate with the pump discharge conduit 22 (which therefore is also the measurement device inlet conduit) and the measurement device discharge conduit 23. The piston 26 is biased to the left in the diagram by a spring 29 to cover discharge port 28. However, piston 26 is forced to the right, in the opening direction, by the pressure of the liquid discharged from the pump to conduit 22, which is admitted to the left end of housing bore 25 of the flow measuring device 14 through inlet port 27. The position of piston 26 therefore is determined by the balance of the force of the inlet liquid pressure against the force of spring 29 plus the pressure of fluid within a chamber 30, which may be designated as a control pressure chamber, enclosed by the right end of housing bore 25 and the piston 26.

The pressure of liquid in chamber 30 is determined by means of a pilot valve 31 which is connected to the control pressure chamber by means of a conduit 32 and respectively connected to the inlet and discharge conduits 22 and 23 by pressure conduits 33 and 34. The pilot valve 31 includes a closed cylindrical housing 35 with a piston 36 having two lands 36a and 36b reciprocally mounted therein. The pilot valve piston 36 is biased to the right in the diagram by a pressure calibration spring 38, the pressure of which may be adjusted by a set screw 39. The closed ends of the inner bore of housing 35 respectively define, with the piston lands 36a and 36b, pressure chambers 40 and 41, which are respectively in communication with the discharge conduit 23 through pressure conduit 34 and a branch conduit 34a, and with liquid inlet conduit 22 through pressure conduit 33 and branch conduit 33a. The pilot piston 36 is positioned at a null point (as shown) by a balance of the input liquid pressure applied to chamber 41 against the discharge liquid pressure applied to the chamber 40 plus the force of calibration spring 38. It will be seen from the diagram that pilot valve lands 36a and 36b respectively cover ports 42 and 43, which communicate with the discharge and inlet liquid pressure conduits 34 and 33.

When a greater pressure difference exists between the inlet conduit 22 and the discharge conduit 23 than that for which the pilot valve calibration spring 38 is set, the greater pressure in chamber 41 over the pressure of chamber 40 causes movement of piston 36 to the left, so that valve land 36a uncovers port 42. A limited communication is thus established between the control pressure chamber conduit 32 through the bore of pilot valve 31 and port 42 to the discharge pressure conduit 34 to reduce the pressure within control pressure chamber 30, permitting piston 26 to move to the right under the force of the inlet pressure from conduit 22. This movement of piston 26 causes an enlargement of the flow restriction at port 28, permitting a higher rate of liquid flow and thereby reducing the pressure drop or pressure difference between inlet conduit 22 and discharge conduit 23 to the required value. The pilot valve piston then returns to the central null position shown, and no further movement of piston 26 results until there is a further change in the pressure difference. In a similar manner, if the pressure difference decreases to a value below that required by the setting of pilot valve calibration spring 38, the pilot valve moves to the right, uncovering port 43 to thereby increase the pressure within control pressure chamber 30, moving piston 26 to the left to decrease the flow restriction at port 28, thus raising the pressure difference to the required value.

It will be recognized that, with a liquid which is relatively incompressible, the volume of fluid flow will be directly proportional to the flow area at the restriction of port 28. The port 28 is preferably shaped so that for a given linear movement of the piston 26 there is a proportionate linear change in the orifice or flow restriction area of the port. The position of piston 26 therefore gives a direct and accurate indication of the liquid flow rate. This indication may be communicated to the exterior of the device by means of a suitable connecting rod 44 on which an indicator 45 may be provided with a suitable indicating scale 46 on which fluid flow rates may be read directly. For control operation in response to the flow indication obtained by the position of connecting rod 44, a differential movement device such as a differential lever 47 is pivotally fastened to connecting rod 44 at one end and to flow level setting device 12 at its other end through an additional connecting rod 48. The flow setting device 12 is preferably held in the position to which it is set by a friction clutch or by a releasable detent clutch as shown including a member 49 which engages a serrated sector member 50. Another connecting rod 51 is pivotally connected from an intermediate point of the differential lever 47 to the pivoted valve member 11 by means of a valve crank arm 52.

In the operation of the system, it will be seen that movement of flow setting device 12 to the right will cause at least a temporary closure of valve 11, assuming that connecting rod 44 is motionless, by means of the connections including connecting rod 48, differential lever 47, connecting rod 51 and crank arm 52. This partial closure of valve 11 causes a decrease in the flow of motive fluid through conduit 19 to the turbine rotor 18 thereby slowing down the pump and causing a lowered flow of liquid delivered through conduits 22 and 23. As described above the measuring device 14 will then operate as follows. Connecting rod 44 will move to the left, following piston 26, to indicate the lowered liquid flow. Since the flow setting device 12 and the connecting rod 48 will now be stationary, this leftward movement of connecting rod 44 is transmitted through differential lever 47, connecting rod 51 and crank arm 52 to partially reopen the valve 11 until an equilibrium point is reached corresponding to the lowered liquid flow rate set by device 12. In a similar manner, movement of flow setting device 12 to the left will cause the system to provide higher liquid flow rates.

A by-pass conduit 23a having an orifice adjustable by a set screw 23b is preferably provided in parallel with the flow restriction at port 28 so that a certain minimum liquid flow is permitted even though port 28 may be completely closed.

Fig. 2 shows a modified and simplified form of the flow measuring device 14 which may be employed in systems and for measurements where linear response is not absolutely essential. In the embodiment of Fig. 2, the pilot valve 31 has been eliminated and the control pressure chamber 30 is connected directly to the discharge conduit 23 by means of pressure conduit 32 so that discharge pressure plus the force of spring 29 balances the inlet pressure from inlet conduit 22. In this embodiment, therefore, the spring 29 provides the pressure calibration of the device which determines the pressure difference to be maintained between the liquid of conduits 22 and 23. Since the spring 29 will exert different forces dependent upon the position of piston 26, according to the well known "spring gradient" force characteristic of springs, the pressure difference between conduits 22 and 23 will vary for different positions of piston 26 corresponding to different liquid flows. This provides a non-linear response for this embodiment of the flow measuring device 14, which may be desirable or of no detriment in some applications, but undesirable and unsatisfactory in others. By contrast, the pressure difference maintained across the flow measuring device embodiment of Fig. 1 is dependent upon the force of pilot valve spring 38 at only one point of operation of the pilot valve, that is, the null or balanced position shown. Therefore, there is no spring gradient error in the operation of that embodiment of the flow measurment device 14 and the response is linear. It will be appreciated that where the non-linearity of the flow measuring device embodiment of Fig. 2 is desired or can be tolerated, it is also desirable because of its simplicity and economy of construction.

Fig. 3 is a sectional view of another alternative embodiment of the liquid flow measuring device 14. This embodiment respresents an improved and more elaborate design than those of Figs. 1 or 2 having a higher power amplification characteristic for a given design value of pressure drop within the device. The greater amplification in this embodiment of the flow measurement device is obtained primarily because the piston member 26 and the housing 24 have been redesigned to provide two control pressure chambers 30 and 30a at the respective ends of piston 26 rather than only one. These control pressure chambers are respectively conected to the pilot valve 31 by means of conduit passages 32 and 32a so that a pressure corresponding to the full pressure drop across the flow measuring device 14 may be applied to either control pressure chamber 30 or 30a for positioning piston 26 with the maximum available force. The spring 29 may be a very weak spring, therefore, which need be provided only to position piston 26 to the left, in the extreme closed position shown, when the measurement device and system is not in operation, so that accurate indications may be obtained whenever operation begins.

An adjustable stop member 55 may be provided to determine the extreme closed position of piston 26 to maintain a minimum opening at the discharge port 28, thus dispensing with the necessity for the passage 23a and the orifice adjustment 23b of the embodiments of Figs. 1 and 2. The housing of this embodiment includes the refinement of a central sleeve 24a, the interior of which defines the central bore 25 for piston 26. In this embodiment the housing 35 of the pilot valve 31 is connected directly to (and supported on) the housing 24 in order to facilitate the hydraulic connections therebetween. For instance, a high pressure inlet liquid connection is obtained by the short passage 33a from the chamber surrounding the inlet port 27 to the pilot valve control pressure chamber 41. Similarly, a short, straight passage 34 is provided to connect the discharge chamber surrounding outlet port 28 to convey discharge liquid pressure to the pilot valve control pressure chamber 40. The pilot valve piston 36 is modified in this embodiment by the addition of a center valve land 36c which controls the admission of high pressure inlet liquid alternatively to one side or the other of the pilot valve central bore from an inlet passage 57 which communicates with inlet port 27. The high pressure liquid is thereby alternatively connected through conduit 32a to control pressure chamber 30a or through conduit 32 to control pressure chamber 30 as piston 36 shifts to the right or left from the null position shown. The ports covered by end lands 36a and 36b are interconnected by a conduit 56 and connected to the low pressure control pressure chamber 40, and from that chamber through passage 34 to the discharge conduit 23. Thus it will be seen that when center land 36c connects high pressure liquid to one of the main valve control pressure chambers 30a or 30, the other of these control pressure chambers is concurrently connected to the low pressure conduit 23 by one of the end lands 36a or 36b as it uncovers its associated discharge port. Thus, in the embodiment of Fig. 3, a double action pilot valve 31 and a double acting main piston 26 are provided for maximum response and maximum output force for the design value of liquid pressure drop. As mentioned above, this pressure drop is determined by the force exerted by pilot valve spring 38, which may be adjusted by means of the adjusting screw 39.

It will be understood that in the system of Fig. 1 the valve 11 controlling the flow of motive fluid to the motor of pump 10 may be actuated through a hydraulic or electrical amplifier by signals transmitted from the flow measurement device 14 and the flow setting device 12, rather than by a direct mechanical connection as shown. In Fig. 4 there is shown an alternative embodiment employing an electrical amplification system of this kind. In this system, electrical potentiometers 60 and 61 may have their respective movable contacts 60a and 61a connected to the flow setting device 12 and the connecting rod 44 of flow measuring device 14 for movement thereby. These potentiometers may preferably have equal resistance values. They are connected together to a ground connection indicated at 62 and energized with equal and opposite direct current voltages by sources such as batteries 63 and 64. The sliding contacts 60a and 61a are connected together through equal valued resistors 65 and 66 to a common connection 67. It will be obvious that if the movable contacts 60a and 61a are at the same relative positions on their respective potentiometers to indicate a fluid flow rate corresponding precisely to that selected, the common connection 67 will be at ground potential. However, if a different liquid flow rate is set by device 12 and potentiometer contact 60a, or if the liquid flow changes due to exterior causes, as indicated by a movement of the connecting rod 44 and potentiometer contact 61a, then a direct current voltage will exist at common connection 67 corresponding in polarity and magnitude to the direction and magnitude of change in flow rate which is required to restore balance to the system. Such voltage, which may be referred to as an error signal or error voltage, may be supplied to a suitable amplifier 68 and when amplified may be connected as shown at 69 to an electrical positioning motor 70. Motor 70 may be connected directly, as schematically shown at 71, or through suitable reduction gears (not shown), to the motive fluid control valve 11. It will be appreciated that the amplification provided by this electrical follow-up system, including the amplifier 68, permits the employment of smaller actuating forces at the flow setting device 12. This electrical system also permits physical separation of the flow setting device 12, the flow measuring device 14 and the motive fluid valve 11 which may sometimes be a major advantage.

As mentioned above, the output of flow measuring device 14 at connecting rod 44 and the position signal supplied by flow setting device 12 may be fed to a hydraulic amplifying system for flow control operation. Such a hydraulic system is shown in Fig. 5 which illustrates a further modification of the control system of Fig. 1. Although it will be understood that a hydraulic positioning system could be employed for valve 11 in the above systems, the system of Fig. 5 is arranged to control the displacement of a variable displacement pump 75 to obtain control of motive fluid input. The variable displacement pump 75 may be of a well-known type in which the degree of tilt or angularity of a "wobble" plate or "swash" plate 76 determines the volume of liquid which is pumped. A horizontal position of the wobble plate 76 corresponds to zero liquid delivery. The pump may be driven by a shaft 77 from a suitable motor (not shown). The shaft 77 need not be driven at constant speed since pump displacement is automatically regulated for desired flow. The degree of tilt of the wobble plate, and the pumping rate may be controlled by means of a built-in hydraulic tilt actuator by means of hydraulic pressure applied from a pressure conduit 78. A pump of this general type is described more completely in a patent application, Serial No. 183,332, filed September 6, 1950, now abandoned, for A Pumping System for Heavy Fuel Oils, by Bruce O. Buckland and Alexander Boiko and assigned to the same assignee as the present application.

In the system of Fig. 5 the control pressure of conduit 78 is determined by a pilot valve 79 including a housing 80 and a piston 81 having valve lands 82 and 83. The housing 80 may also include fluid ports 84 and 85 respectively covered by the valve lands 82 and 83 and respectively connected to sources of high and relatively low pressure hydraulic control fluid (not shown). It will be seen that if piston 81 is moved to the left, the valve land 82 will uncover the high pressure port 84, raising the control pressure of conduit 78 and causing greater pump displacement and higher liquid flow. Conversely, movement of piston 81 to the right will uncover port 85 causing a decrease in control pressure, pump displacement, and liquid flow. The piston 81 is connected for such movements in response to the relative positions of connecting rod 44 and of flow setting device 12. The connection from connecting rod 44 to piston 81 is through a suitable compression spring 86 which may be compressed between an enlarged tip 87 of the connecting rod 44 and an enlarged tip 88 of the piston 81. Similarly, the flow setting device 12 is connected to the piston 81 through a shaft shown schematically at 89 connected for the rotation of a control cam 90. The cam 90 engages a cam follower 91 to compress a spring 92 against an enlarged tip 93 of the piston 81. The forces transmitted through the springs 86 and 92 must be equal unless movement of pilot piston 81 is to result.

In operation, if the flow setting device 12 is rotated so as to turn the control cam 90 clockwise, the compression of spring 92 will be increased, causing pilot piston 81 to move to the left, raising the control pressure of conduit 78 to increase the displacement of pump 75 to thereby increase the liquid flow. The resulting increase in flow will cause a movement of the piston of flow measuring device 14 to the right, increasing the compression of spring 86 through movement of connecting rod 44, to move piston 81 back to the right to the null position shown when the increased flow set by movement of flow setting device 12 has been achieved, and no further adjustment of the displacement of pump 75 is required.

The following claims are intended to define the valid scope of this invention over the prior art and to cover all changes and modifications falling within the true spirit and valid scope of the invention.

What I claim as new and desire to secure by Letters Patent of the United States is:

1. A fluid flow indicating device comprising a closed cylindrical housing having input and discharge ports, a reciprocable piston mounted within said cylinder and defining an orifice with said discharge port which is variable upon piston movement, said piston and one end of said cylindrical housing defining a control pressure chamber for containing fluid under pressure for bias of said piston in a first direction, a spring positioned against said piston for bias thereof in said first direction, the other side of said piston being in communication with the inlet port and the fluid under pressure supplied thereto for bias in a second direction, a pilot valve connected to both said inlet and discharge ports and to said control pressure chamber having a valve element alternately movable to connect the inlet or discharge ports to said control pressure chamber to alter the fluid pressure therein, said pilot valve element including a calibration spring and an end connection to said discharge port for bias thereof in a first direction and an end connection to said inlet port for bias in a second direction for maintenance of a constant pressure difference between said inlet and discharge ports determined by said calibration spring by variation of the pressure within said control pressure chamber, and an indicating device connected to said piston and extending outside said housing for indicating the rate of fluid flow in terms of the position thereof.

2. A fluid flow measuring device comprising a closed cylindrical housing having a piston member reciprocably mounted therein for indicating fluid flow in terms of the positon thereof, said housing including input and discharge ports, said piston member including end lands respectively defining control pressure chambers with each of the ends of said cylindrical housing, one of said end lands being arranged and positioned to define a variable area discharge orifice with said discharge port, a pilot valve including a second housing having a cylindrical bore and a pilot valve piston reciprocably mounted therein, said pilot valve including at least one valve land for alternately controlling the flow of a hydraulic pressure fluid to either of two control lines upon movement of said pilot valve piston away from a central null position, said pilot valve control pressure lines being respectively connected to said control pressure chambers for controlling the position of said piston member, said pilot valve piston including end lands for defining control pressure chambers with the respective ends of said pilot valve housing bore, said pilot valve control pressure chambers being respectively connected to communicate with said inlet and discharge ports for positioning of said pilot valve piston in accordance with the pressure difference therebetween.

3. A system for measuring and controlling fluid flow at a desired flow level comprising means for controlling the volume of fluid supplied to said system, means for setting a desired flow rate, means for measuring the flow rate achieved comprising a closed housing having a cylindrical bore therein and a piston reciprocably mounted within said bore, said housing including inlet and discharge ports communicating with said bore, said piston and one of said ports together defining an orifice variable in accordance with the position of said piston, and connections from said inlet and discharge ports to said piston for positioning said piston in accordance with the pressure difference therebetween to thereby maintain a substantially constant pressure across said orifice, said piston including an operating rod connected thereto and extending through said housing for indicating the position of said piston as a measure of the flow rate, and means connected between said operating rod and said setting means for comparing the flow measurement with the flow setting and for altering the operation of said fluid flow control means to correct for any difference therebetween.

4. A fluid flow measuring and control apparatus comprising a housing having a cylindrical chamber therein, said housing including fluid inlet and discharge ports communicating with said cylindrical chambers, a piston reciprocably mounted within said cylindrical chamber to variably cover said discharge port to thereby vary the effective area thereof, means connected to said inlet and discharge ports and connected to said piston including a spring member for maintaining a pressure difference between said inlet and discharge ports as determined by a force exerted by said spring member, an operating rod connected to said piston and extending from said piston through said housing to give an indication of piston movement exterior of said housing, a fluid flow setting device physically positionable with respect to said housing to determine a desired fluid flow rate, and fluid flow control means connected to both said operating rod and said setting device and operable in response to the respective positons thereof for varying the fluid flow rate.

5. A fluid flow delivery system comprising a pump, a fluid flow measurement device including a housing having a cylindrical inner bore, said housing including inlet and discharge ports communicating with said bore, a fluid connection from the outlet of said pump to said inlet port for transmitting the pumped fluid from said pump to said bore, a piston reciprocably mounted within said bore to variably cover said discharge port, means including a spring connected to said inlet and discharge ports and responsive to the pressures thereof connected for positioning said piston to maintain a pressure difference in accordance with a force derived from said spring, a connecting rod connected to said piston and positionable therewith extending through a suitable opening in said housing to the exterior thereof, a flow setting device for determining desired fluid flow rates in terms of the physical position thereof, and means interconnecting said setting device and said connecting rod and connected to said pump for controlling the volume of fluid delivered by said pump in response to the respective positions thereof.

6. A liquid delivery system comprising a motive fluid driven liquid pump, a valve device connected to control the flow of motive fluid thereto, a flow measurement device including a housing having a cylindrical inner bore, said housing including inlet and discharge ports communicating with said bore, a connection from the outlet of said pump to said inlet port for transmitting the pumped liquid from said pump to said bore, a piston reciprocably mounted within said bore to variably cover said discharge port, means including a spring connected to said inlet and discharge ports and responsive to the pressures thereof connected for positioning said piston to maintain a pressure difference in accordance with a force derived from said spring, a connecting rod connected to said piston and positionable therewith extending through a suitable opening in said housing to the exterior thereof, a flow setting device for determining desired liquid flow rates in terms of the physical position thereof, and means interconnecting said setting device and said connecting rod and connected to position said valve device for controlling the volume of fluid delivered by said pump in response to the respective positions thereof.

7. A fluid flow measuring and control apparatus comprising a housing having a cylindrical chamber therein, said housing including fluid inlet and discharge ports communicating with said cylindrical chamber, a piston reciprocably mounted within said cylindrical chamber to variably cover said discharge port to thereby vary the effective area thereof, means connected to said inlet and discharge ports and connected to position said piston including a spring member for maintaining a pressure difference between said ports as determined by a force exerted by said spring member, a connecting rod extending from said piston to the exterior of said housing to indicate the position thereof, a movable flow setting device for selecting a desired fluid flow rate, a differential movement transmitting device connected for movement by both said setting device and said connecting rod to obtain an output movement proportional to the differences of the respective movements thereof, and a valve device connected for movement by said differential device for control of said fluid flow rate.

8. A liquid delivery system comprising a motive fluid driven liquid pump, a valve device connected to control the flow of motive fluid thereto, flow measuring apparatus connected to the outlet of said pump comprising a variable area fluid flow restriction device having a member movable to adjust the flow restriction area, pressure responsive means including a spring member connected to both the upstream and downstream sides of said flow restriction device and connected for positioning said movable member in accordance with a pressure difference between said upstream and downstream sides corresponding to a force of said spring member, a reciprocable member connected to said movable member for movement therewith, a flow setting device positionable to select desired flow rates, a differential lever pivotally connected at its ends to said reciprocable member and said flow setting device, and a connecting rod pivotally connected from an intermediate position on said differential lever to said valve device for control of said valve device in response to differential movements of said flow setting device and said reciprocable member.

9. A liquid delivery system comprising a motive fluid driven liquid pump, a valve device connected to control the flow of motive fluid thereto, a flow measuring apparatus connected to the outlet of said pump comprising a variable area fluid flow restriction device having a member movable to adjust the flow restriction area, pressure responsive means including a spring member connected to both the upstream and downstream sides of said flow restriction and connected to said movable member for positioning thereof in accordance with a pressure difference between said upstream and downstream sides corresponding to a force of said spring member, a reciprocable member connected to said movable member for movement therewith, a flow setting device positionable to set desired flow rates, opposite polarity variable voltage devices respectively connected to said flow setting device and said reciprocable member for voltage varying adjustment thereby, an amplifier connected to receive and measure the differences in amplitudes of the voltages from said respective voltage devices, and a positioning motor connected for energization from said amplifier and connected to said valve device for adjustment thereof in response to differences in the voltage amplitudes from said respective voltage devices.

10. A variable flow liquid delivery system comprising a variable displacement liquid pump, a flow measuring device connected to measure the flow delivery of said pump comprising a movable member providing a fluid flow restriction adjustable upon movement thereof, pressure responsive apparatus connected to the inlet and discharge sides of said flow restriction and connected to said movable member for positioning thereof in accordance with the pressure difference of the fluid in said inlet and discharge sides, said pressure responsive apparatus including a spring member for providing a force determinant of the pressure difference to be maintained by movement of said movable member, an indicating member connected to said movable member for movement therewith as a measure of fluid flow, a flow setting device positionable to select a desired liquid delivery flow level, and apparatus connected to said indicator member and to said flow setting device positionable responsive to the relative positions thereof and connected to control the displacement of said variable displacement pump to thereby maintain the fluid flow rate selected by said flow setting device.

11. A fluid flow measuring device comprising a closed cylindrical housing having a fluid inlet port and a fluid discharge port, a piston reciprocally mounted in the housing, said piston and one of said ports defining an orifice having an area variable in accordance with the position of said piston, said piston and one end of said housing defining a control pressure chamber, biasing means for biasing said piston in an orifice closing direction, pilot valve means connected to both said inlet and discharge ports and to said control pressure chamber and having a valve element alternately movable to connect the inlet or discharge port to said control pressure chamber to alter the fluid pressure therein and cause movement of said piston in the orifice opening or closing direction to thereby maintain a fluid pressure drop across said orifice as determined by said biasing means, and indicating means connected to said piston for indicating the position thereof as a measure of fluid flow.

12. A fluid flow measuring and control apparatus comprising a closed cylindrical housing having a piston reciprocally mounted therein, said housing including a fluid inlet port and a fluid discharge port, means for delivering fluid to said inlet port, said piston and one of said ports defining an orifice having an area variable in accordance with the position of said piston, said piston and one end of said housing defining a control pressure chamber, biasing means for biasing said piston in an orifice closing direction, pilot valve means connected to both said inlet and discharge ports and to said control pressure chamber and having a valve element alternately movable to connect the inlet or discharge port to said control pressure chamber to alter the fluid pressure therein and cause movement of said piston in the orifice opening or closing direction to thereby maintain a fluid pressure drop across said orifice as determined by said biasing means, and means responsive to movement of said piston for controlling the volume of fluid delivered to said inlet port.

13. A variable flow fluid delivery system comprising a variable displacement fluid pump, a flow measuring device connected to measure the flow delivery of said pump comprising a movable member providing a fluid flow restriction adjustable upon movement thereof, pressure responsive apparatus connected to the inlet and discharge sides of said flow restriction and connected to said movable member for positioning thereof in accordance with the pressure difference of the fluid in said inlet and discharge sides, said pressure responsive apparatus including biasing means for providing a force determinant of the pressure difference to be maintained by movement of said movable member, an indicating member connected to said movable member for movement therewith as a measure of fluid flow, a flow setting device positionable to select a desired fluid delivery flow level, and apparatus connected to said indicating member and to said flow setting device positionable responsive to the relative positions thereof and connected to control the displacement of said variable displacement pump to thereby maintain the fluid flow rate selected by said flow setting device.

14. A fluid flow measuring device comprising a closed cylindrical housing having a fluid inlet port and a fluid discharge port, a piston reciprocally mounted in the housing, said piston and one of said ports defining an orifice having an area variable in accordance with the position of said piston, said piston and one end of said housing defining a control pressure chamber, biasing means for biasing said piston in an orifice closing direction, control means connected to both said inlet and discharge ports and to said control pressure chamber and including means to connect said inlet or said discharge port to said control pressure chamber to alter the fluid pressure therein and cause movement of said piston in the orifice opening or closing direction to thereby maintain a fluid pressure drop across said orifice as determined by said biasing means, and indicating means connected to said piston for indicating the position thereof as a measure of fluid flow.

15. A system for measuring and controlling fluid flow through a conduit to a fluid-using apparatus comprising a closed housing having a cylindrical bore therein and a piston reciprocably mounted within said bore, said housing including inlet and discharge ports communicating with said bore, said inlet port being in communication with the fluid flowing through said fluid-using apparatus, said piston and one of said ports together defining an orifice variable in accordance with the position of said piston, said piston and one end of said bore defining a control pressure chamber, biasing means for biasing said piston in an orifice closing direction, control means connected to both said inlet and discharge ports and to said control pressure chamber and including means to connect the inlet or discharge port to said control pressure chamber to alter the fluid pressure therein and cause movement of said piston in the orifice opening or closing direction to thereby maintain a fluid pressure drop across said orifice as determined by said biasing means, indicating means associated with said piston for indicating the position of said piston as a measure of the rate of fluid flow through said housing, flow setting means for setting a desired rate of fluid flow through said conduit, volume control means for controlling the volume of fluid supplied through said conduit to said fluid-using apparatus, and means for comparing the flow rate as measured by said indicating means with the desired flow rate set by said flow setting means and for altering the operation of said volume control means to correct for any difference therebetween.

References Cited in the file of this patent

UNITED STATES PATENTS

| | | |
|---|---|---|
| 445,348 | Stabler | Jan. 27, 1891 |
| 859,327 | McMullen | July 9, 1907 |
| 1,057,621 | Cross | Apr. 1, 1913 |
| 1,112,394 | Sprado | Sept. 29, 1914 |
| 1,580,678 | Roucka | Apr. 13, 1926 |
| 1,580,679 | Roucka | Apr. 13, 1926 |
| 2,035,472 | Hammond | Mar. 31, 1936 |
| 2,279,571 | Kane | Apr. 14, 1942 |
| 2,647,402 | Ibbott | Aug. 4, 1953 |
| 2,675,020 | Breitwieser | Apr. 13, 1954 |
| 2,694,979 | Lauck | Nov. 23, 1954 |
| 2,697,445 | Cowles | Dec. 21, 1954 |

FOREIGN PATENTS

| | | |
|---|---|---|
| 217,582 | Great Britain | June 5, 1924 |
| 389,969 | Germany | Jan. 31, 1922 |